(12) United States Patent
Wilson

(10) Patent No.: US 8,341,751 B2
(45) Date of Patent: Dec. 25, 2012

(54) SOFTWARE LICENSE MANAGEMENT

(76) Inventor: Kelce S. Wilson, Murphy, TX (US)

( * ) Notice: Subject to any disclaimer, the term of this patent is extended or adjusted under 35 U.S.C. 154(b) by 1165 days.

(21) Appl. No.: 11/964,682

(22) Filed: Dec. 26, 2007

(65) Prior Publication Data

US 2011/0167498 A1 Jul. 7, 2011

(51) Int. Cl.
*G06F 7/04* (2006.01)
(52) U.S. Cl. ............ 726/26; 726/22; 726/23; 726/24; 726/25; 713/187; 713/189; 713/193; 717/168; 717/169; 717/170; 717/173; 717/174; 711/164
(58) Field of Classification Search ............ 726/2, 4, 726/6, 26, 30, 22, 23, 24, 25; 717/168, 169, 717/173–178; 711/164; 713/187, 189–193; 380/287
See application file for complete search history.

(56) References Cited

U.S. PATENT DOCUMENTS

| | | | |
|---|---|---|---|
| 5,490,216 A | 2/1996 | Richardson | |
| 6,411,941 B1 | 6/2002 | Mullor | |
| 7,069,595 B2 * | 6/2006 | Cognigni et al. | 726/26 |
| 7,484,103 B2 * | 1/2009 | Woo et al. | 713/189 |
| 7,752,138 B1 * | 7/2010 | Dean et al. | 705/59 |
| 7,774,281 B2 * | 8/2010 | Okamoto et al. | 705/59 |
| 7,809,648 B2 * | 10/2010 | Misra et al. | 705/59 |
| 8,175,978 B2 * | 5/2012 | Endoh | 705/59 |
| 2003/0120938 A1 * | 6/2003 | Mullor | 713/190 |
| 2005/0044397 A1 * | 2/2005 | Bjorkengren | 713/200 |
| 2006/0080654 A1 * | 4/2006 | Shelton | 717/173 |
| 2006/0136745 A1 * | 6/2006 | Taylor | 713/187 |
| 2007/0006150 A9 * | 1/2007 | Walmsley | 717/120 |
| 2007/0033419 A1 * | 2/2007 | Kocher et al. | 713/193 |
| 2008/0148060 A1 * | 6/2008 | Thorell | 713/187 |
| 2009/0228982 A1 * | 9/2009 | Kobayashi | 726/26 |
| 2009/0228984 A1 * | 9/2009 | Sterin | 726/26 |
| 2010/0211945 A1 * | 8/2010 | Doui | 717/176 |
| 2010/0228673 A1 * | 9/2010 | Pesl | 705/54 |

* cited by examiner

*Primary Examiner* — Thu Ha Nguyen
(74) *Attorney, Agent, or Firm* — Kelce S. Wilson

(57) ABSTRACT

A method of managing a software license comprises loading a software program into volatile memory, obtaining authorization data, modifying a portion of the volatile memory relied upon by the program in accordance with the authorization data, executing the program, and causing the modifications to be deleted from the volatile memory. In some embodiments, selection criteria compared with the authorization data does not contain information corresponding to all of the content of the authorization data, thereby denying a software attacker the benefit of identifying and exploiting the selection criteria.

11 Claims, 9 Drawing Sheets

SOFTWARE LICENSE MANAGEMENT

TECHNICAL FIELD

The invention relates generally to computer security, and more particularly, to software license management and anti-piracy software protection.

BACKGROUND

Software license management systems typically obtain authorization data from a user who wishes to use the software, for example, by requesting a password, searching for a dongle coupled to the computer, or a specific media disk in a drive, scanning a fingerprint, or otherwise obtaining data from a security token. When the license management system then compares the authorization data, or else the result of an algorithm operating on the authorization data, for example a hash function, with security criteria. If there is a match, the license management system launches execution of the protected software. If there is no match, the license management system is supposed to deny access to the protected software.

Unfortunately, there is a common software cracking technique, known as "branch jamming", in which the critical decision point, often a conditional jump instruction, in the security system is identified and changed. Possible changes include replacing the conditional jump with an unconditional jump or else a no operation (NOP) instruction. This change defeats the intentions of the software security programmer, and permits access to the protected software without the proper authorization data. This type of software attack is often quite effective when the software license management system and the protected software both reside on a computer system under the control of the attacker.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
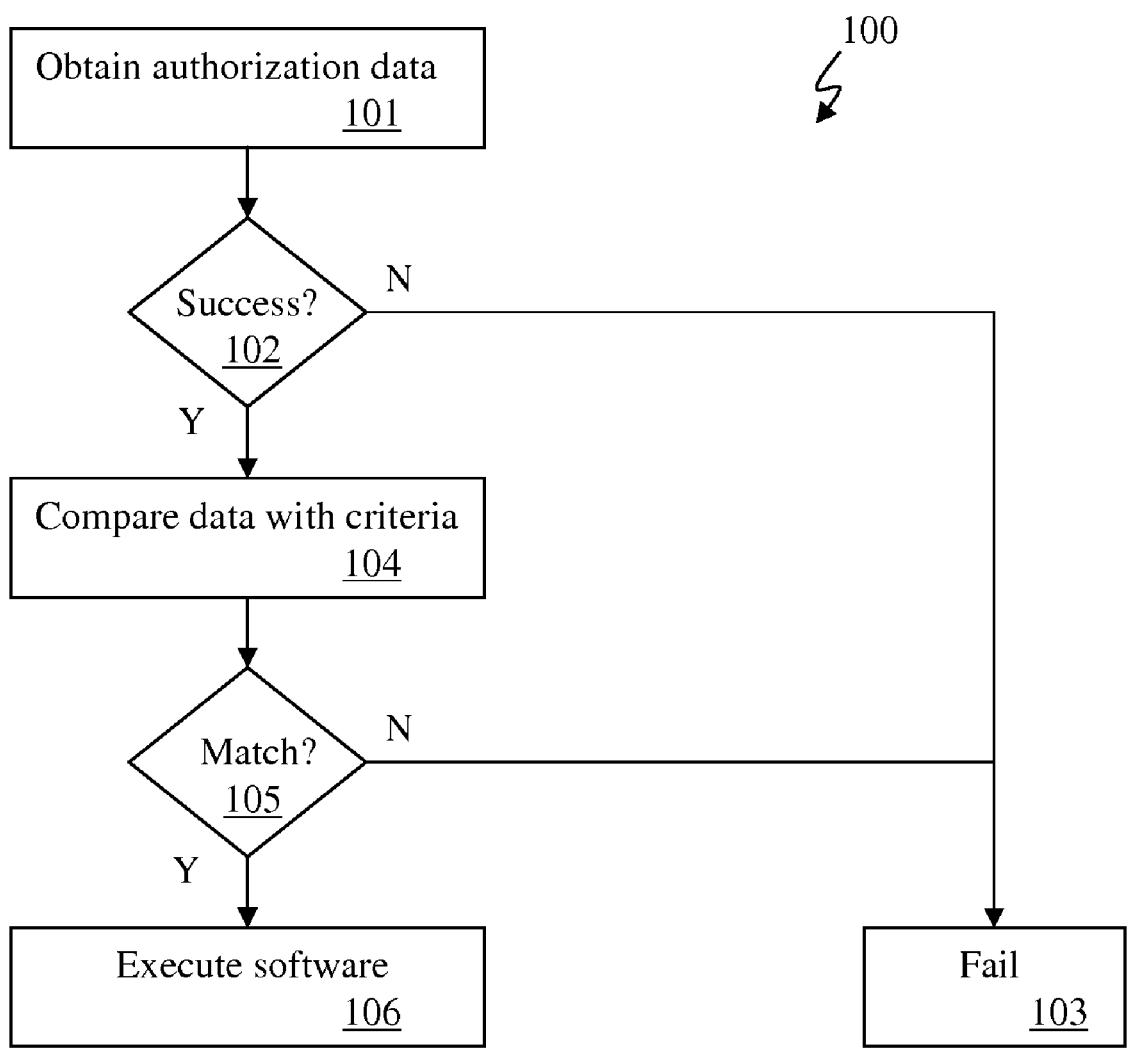
FIG. 1 illustrates a flow diagram for a prior art method for software license management.

FIG. 1 illustrates a flow diagram for a prior art method 100 for software license management. A prior art system obtains authorization data in block 101, for example a password, a fingerprint, and/or data from a dongle, a CD, or other security token. In decision block 102, the system determines whether any data has been obtained. If not, method 100 goes to a fail state in block 103, for example displaying a message stating "password not entered". If however, data has been obtained, the obtained data is compared with authorization criteria in block 104. This may be a simple byte by byte comparison, or else the authorization data may be processed, for example by hashing or application of another algorithm, and the result is then compared with the criteria. Alternatively, the criteria may be processed, and the processing result is used for the comparison. Typically, the authorization test criteria used for comparing against the authorization data is available to the program separately from entry of the authorization data, to enable the license management system to make an independent determination of the correctness of the authorization data. In decision block 105, the comparison result is determined, and if there is no match, i.e. the authorization data is incorrect, method 100 goes to a fail state in block 103. This second possible entry into fail state 103 may be a different block of software, for example a message stating "password is incorrect". If there is a match, as determined in decision block 105, the prior art method 100 results in the execution of the protected software in block 106. Method 100 may be integrated into the protected software, or else may be accomplished by a separate launcher.

Figure 2:
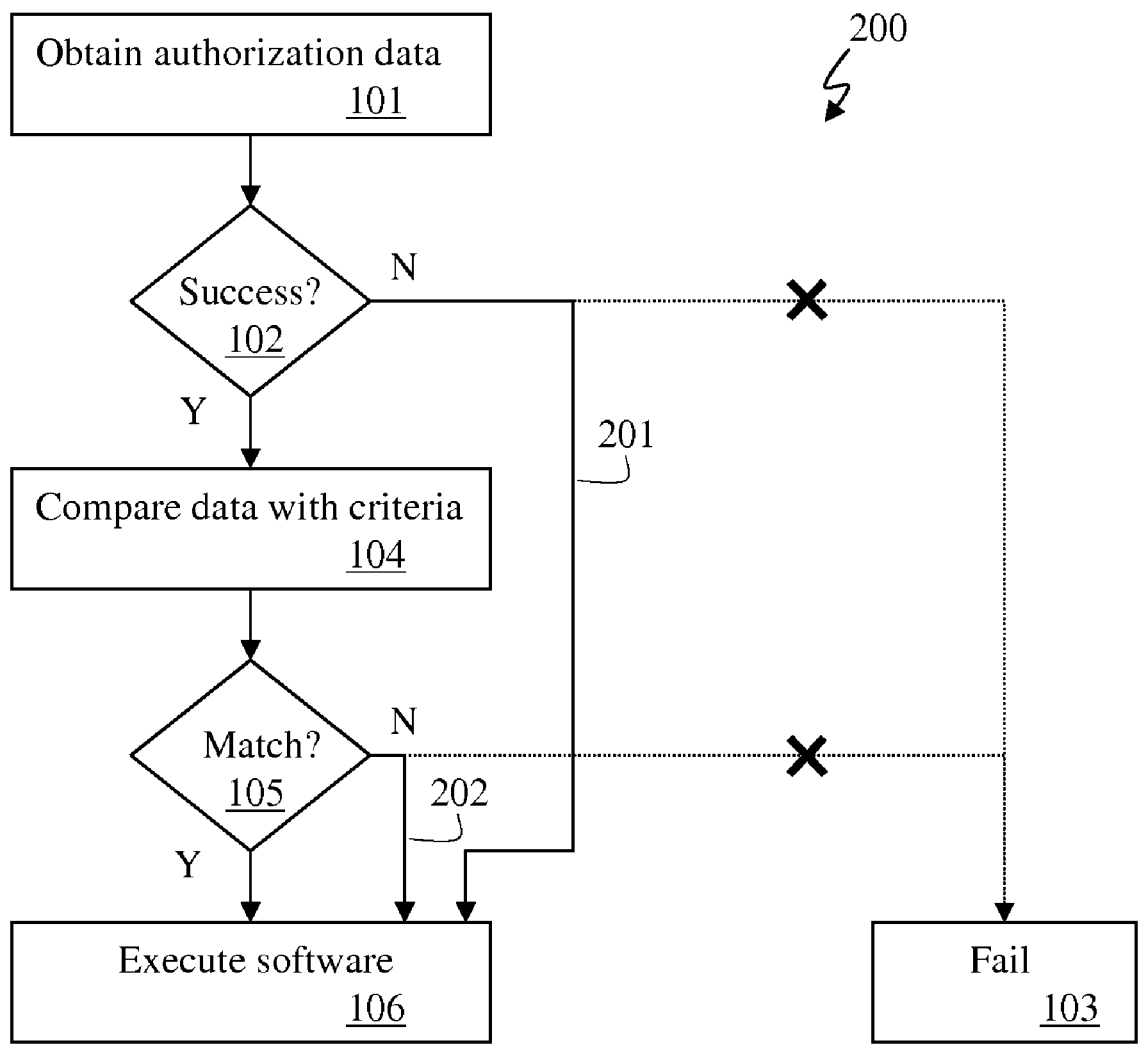
FIG. 2 illustrates a branch jamming attack.

FIG. 2 illustrates a branch jamming attack in altered method 200. Software attacks are described in "Introduction to Software Protection Concepts" by Kelce Wilson, in Intellectual Property Today, August 2007, the entire disclosure of which is hereby incorporated by reference. Similar to method 100, method 200 attempts to obtain authorization data in block 101 and checks for success in decision block 102. However, an attacker has modified the protected software or launcher, in accordance with a branch jamming attack described previously. That is, a conditional jump implemented as part of decision block 102 has been modified to be either a NOP or an unconditional jump, thereby introducing an alternative path 201 to execution block 106, preventing method 200 from going into a fail state in block 103. In some situations, the entire section of the software related to checking for authorization data may be NOP'd out. Alternatively, incorrect data may be injected into the memory location used to store a comparison result, the instructions may be changed to calculate a mistaken value, or else a jump condition may be inverted, for example by changing a "jump if equal" (JE) to a "jump if not equal" (JNE). The branch jamming attack at decision block 102 enables execution of the protected software without entering or providing any authorization data. Alternatively, or in addition, the attacker may target the match decision in block 105, introducing alternative path 202 to route method 200 into execution block 106 instead of a fail state in block 103, when incorrect authorization data is entered or provided.

U.S. Pat. No. 6,411,941, METHOD OF RESTRICTING SOFTWARE OPERATION WITHIN A LICENSE LIMITATION ('941 patent), discloses a prior art software license management system that operates similarly to method 100 in FIG. 1. The '941 patent teaches that license decision data is obtained from the computer basic input/output system (BIOS) and also from a remote license bureau 7. Independent of where the data is stored, processed, or how it is obtained, the systems and methods taught in the '941 patent are vulnerable to branch jamming attacks, similar to the one shown in FIG. 2. Specifically, column 2, lines 19-20 and 56-59 describe the operation of a license verifier that searches for a match, and then either launches the protected software or responds in another manner. The portions of the license verifier that determine the jump conditions or carry out the conditional jump may be altered to permit execution of the protected software, even if no license data is stored in the BIOS and/or the remote license bureau 7 has never been contacted to request any license data. In the teachings of the '941 patent, the data stored in the BIOS may be considered either authorization data or test criteria, since the methods taught indicate merely determining a match between the data in the BIOS and date obtained in another manner. In some systems, the designation of authorization data versus test criteria may be arbitrary.

This vulnerability is at least partially addressed by U.S. patent application Ser. No. 10/300,905, METHOD OF SECURING SOFTWARE AGAINST REVERSE ENGINEERING ('905 application). The '905 application teaches substituting central processing unit (CPU) instructions with tokens, thereby placing the software into a state in which it will not function properly without compensating for the substitutions. Some of the methods taught include micropatching the CPU to respond to the token with some desired functionality, and manipulating an execution pointer based on an external data structure in response to a token. Unfortunately, the tokens may be easily identifiable using a string search of the executable program, thereby flagging portions of the program that an attacker may need to modify for a branch jamming attack.

One scenario of attack is that an attacker obtains a single license for using a copy of the software and runs both a licensed version of the software and an unlicensed version of the software within stealthy debugging environments, performing run traces. In a run trace, executed instructions and certain memory changes are recorded. Hardware emulators and some software based virtualization systems provide stealthy debugging environments that may avoid detection by most debugging detection methods. The resulting run traces may then be compared side by side to enable determination the functionality replaced by the tokens. The functionality is likely to be fairly simple, at least in the case for micropatching. An attacker can then create an equivalent of the functionality displaced by the tokens. Only the first token encountered needs to be reverse engineered. Subsequent identical tokens in the same software may be patched around using a relatively simple string search and replace with jumps to the attacker's equivalent routines. Further, whenever other software is encountered that uses a similar token system, either a different type of program or else a copy of the original program on a different computer, the tokens may be replaced with jumps to the recreated functionality, using a simple string search and replace. What an attacker learns by attacking one program protected by tokens facilitates attack against any other software using a similar token protection scheme.

Thus, in some situations, the tokens may actually facilitate reverse engineering and tampering by drawing an attacker's attention to very same critical decision making steps in the license management system that the software developer wanted to protect. To the extent necessary to understand the claims following, the disclosures of both the '941 patent and the '905 application are incorporated by reference. However, any statements regarding the effectiveness of the systems and methods disclosed in the '941 patent and the '905 application are specifically disagreed with. No software security system, including the one presented herein is impervious to attack.

One solution to the vulnerabilities of the '941 patent and the '905 application is to replace the software instructions or data relied upon by the software with different values, which are not identifiable as tokens. That is, the changes are not changes to predetermined, limited set of tokens that could be found by a search and replace, or are otherwise identifiable by their value or content, but rather use possibly random values or else different values that result in less capable software. For some types of changes, an attempt to execute software with the changes in place will result in a computer crash, but for other types of changes, the software may operate properly to completion, but with less precise data or reduced functionality. The repair of the software back to its more capable state can then be accomplished, for example, by a launcher identifying the bytes to be repaired using their locations. The information used in the repair may include the license management information, whether locally stored, such as in firmware, obtained remotely, such as from a license bureau, typed in by a user, or obtained from a storage device coupled to the computer. For example, a security token, such as a dongle, may provide a license key, parts of which identify the locations of bytes in files to be changed, and parts of which identify the changes to make. In some situations, the addresses and restoring data may not be readily apparent from the license information, but rather may be produced by passing the license information through an algorithm.

By changing software instruction bytes or bytes of data relied upon by the software for proper execution, a protected software program can be rendered less capable or even inoperable. By using a software license management system, for example a launcher, to modify (repair) the changed bytes with information derived from license data, prior to launching the protected software, a branch jamming attack will result in the launch and execution of damaged, less capable software. The result may be reduced operability or even a crash of the computer process. The protected software, possibly including a launcher, is likely to be stored on a computer readable medium, such as for example magnetic media, optical media, volatile memory, and non-volatile memory. The protected, changed software may be stored in permanent or non-volatile memory. However, the modified (repaired) software and data, which is the version to be executed, should only be written to volatile memory and deleted from that memory as soon as practical after execution, to minimize the chance of a memory grab by a software attacker.

One embodiment of an improvement to the systems and methods taught in the '941 patent and the '905 application includes modifying, using information derivable from the license record, portions of the selected program in volatile memory not identified by tokens and/or data relied upon by the selected program, executing the selected program, and causing the selected program to be deleted from volatile memory. This requires the bytes to be modified to have previously been changed from one state to a state that reduces the capability of the software. The data relied upon by the selected program may be data constants, jump addresses, names of auxiliary files or dynamic link libraries (DLLs), case variables, user interface commands and/or other information used in program execution control. Another embodiment of an improvement to the systems and methods taught in the '941 patent and the '905 application includes modifying portions of the software at bytes not identified by tokens; and causing the modified program to be deleted from volatile memory. The purpose of causing the modified program to be deleted from volatile memory is to minimize the chance of a memory grab by an attacker, which could result in the modified program being stored in its more capable state and available for execution without the need for the repair procedure. Causing the modified program to be deleted from volatile memory may be as simple as closing the process, so that the operating system (OS) can be expected to purge the volatile memory. However, further actions may be taken, such as deleting any copies of the modified program from swap space, preventing the OS from writing copies of the modified software to virtual memory, or overwriting any memory or storage space that had contained the modified program with other data.

Figure 3:
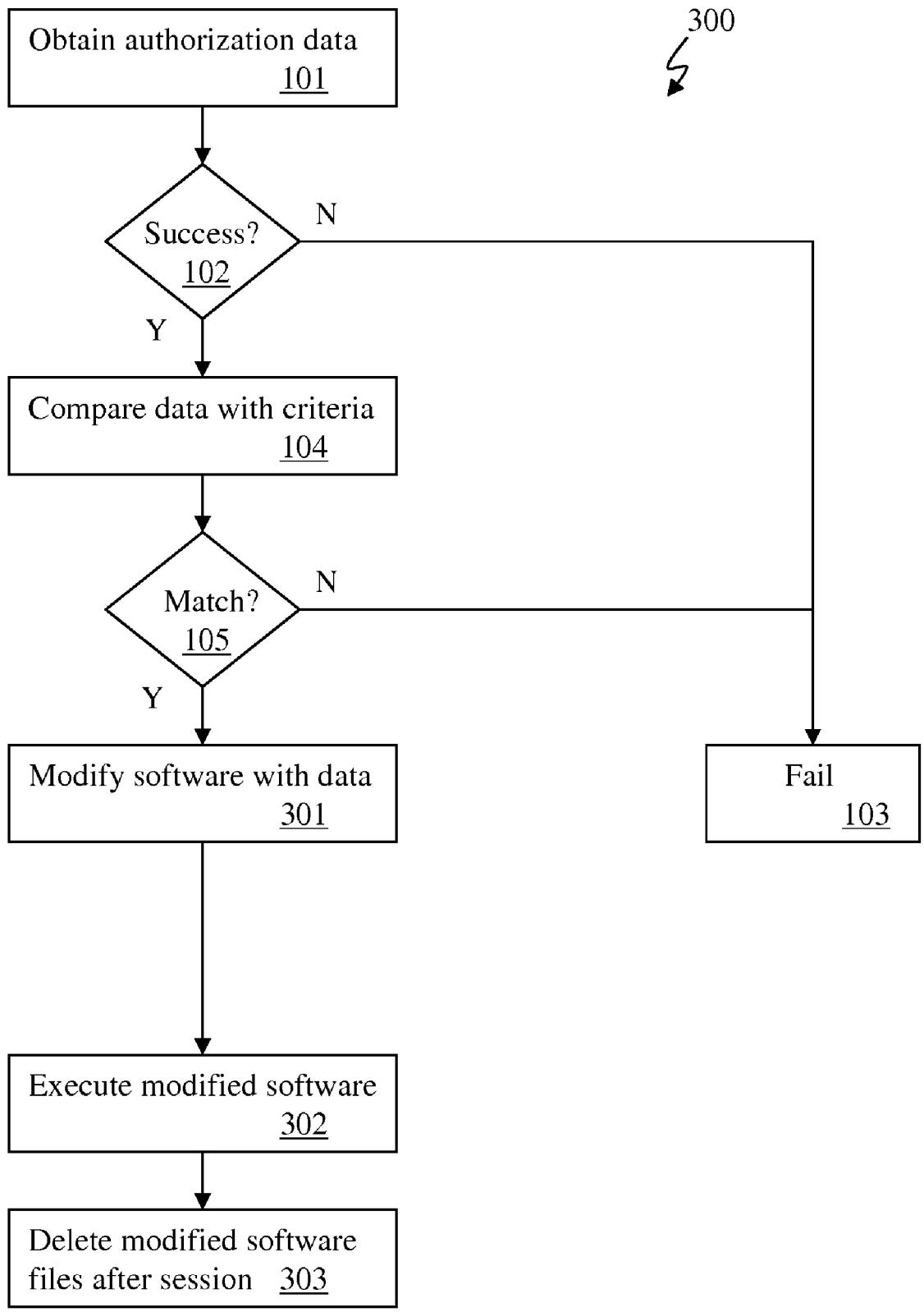
FIG. 3 illustrates a flow diagram for an improved software license management method.

FIG. 3 illustrates a flow diagram for an improved software license management method 300. Some embodiments of method 300 may be similar to method 100, from obtaining the authorization data in block 101 through determining whether the authorization data matches the authorization criteria in decision block 105. However, in block 301, the software, or data bytes relied upon by the software, are modified in volatile memory. This modification improves the capability of the software, either restoring full capability, or possibly restoring only part of the capability, depending on the particular license granted to the user. For example, one user may have only paid for partial capability, and so only those portions of the software are repaired, whereas another user may have paid for full capability on a different computer. The number of bytes modified in block 301 will typically be small compared to the size of the software program and associated data files stored on permanent media, and should include critical control flow instructions and/or data used in important calculations or control. Thus, the software program, as permanently stored, is likely to contain mostly functioning software that is impaired at critical points.

This form of protection should be distinguished from encryption shells, in which data or instructions are stored in an encrypted state and decrypted at some point prior to execution. For typical encryption shell protection, the decryption process changes a predetermined set of bytes from an encrypted state, which likely has no similarities to software instructions or usable data, according to a predetermined algorithm, based on a key entered by the user or accessible to a decrypting launcher. In some embodiments, the modification in block 301 includes replacement of bytes, which is not decryption. In some embodiments, the modification in block 301 includes substitution of a set of data and instructions that would allow the program to operate, although in a less capable state, with a second set that allows the program to operate with more capability. For example, the mantissa of a floating point value may be changed to reduce significant figures of a value used in a calculation. This is not feasible with most good encryption algorithms, because the encrypted bytes would not likely comprise operable instructions and data. In some embodiments, the modification information used in block 301 includes an indication of the location of modifications to be made in volatile memory, which is information not included in decryption keys, and is not predetermined. In some embodiments, the modification information used in block 301 includes an indication of the manner of making modifications, whether simple replacement or a Boolean operation, which is essentially a selection of an algorithm, and is also not information which is included in decryption keys. However, it should be understood that block 301 may use decryption as part of the set of modifications. In block 302, the software is executed, using modified instructions and/or data. In block 303, the modifications are deleted from volatile memory along the program. This type of protection complicates matters for a software attacker, and thus provides an additional level of protection over the prior art method 100 shown in FIG. 1.

Figure 4:
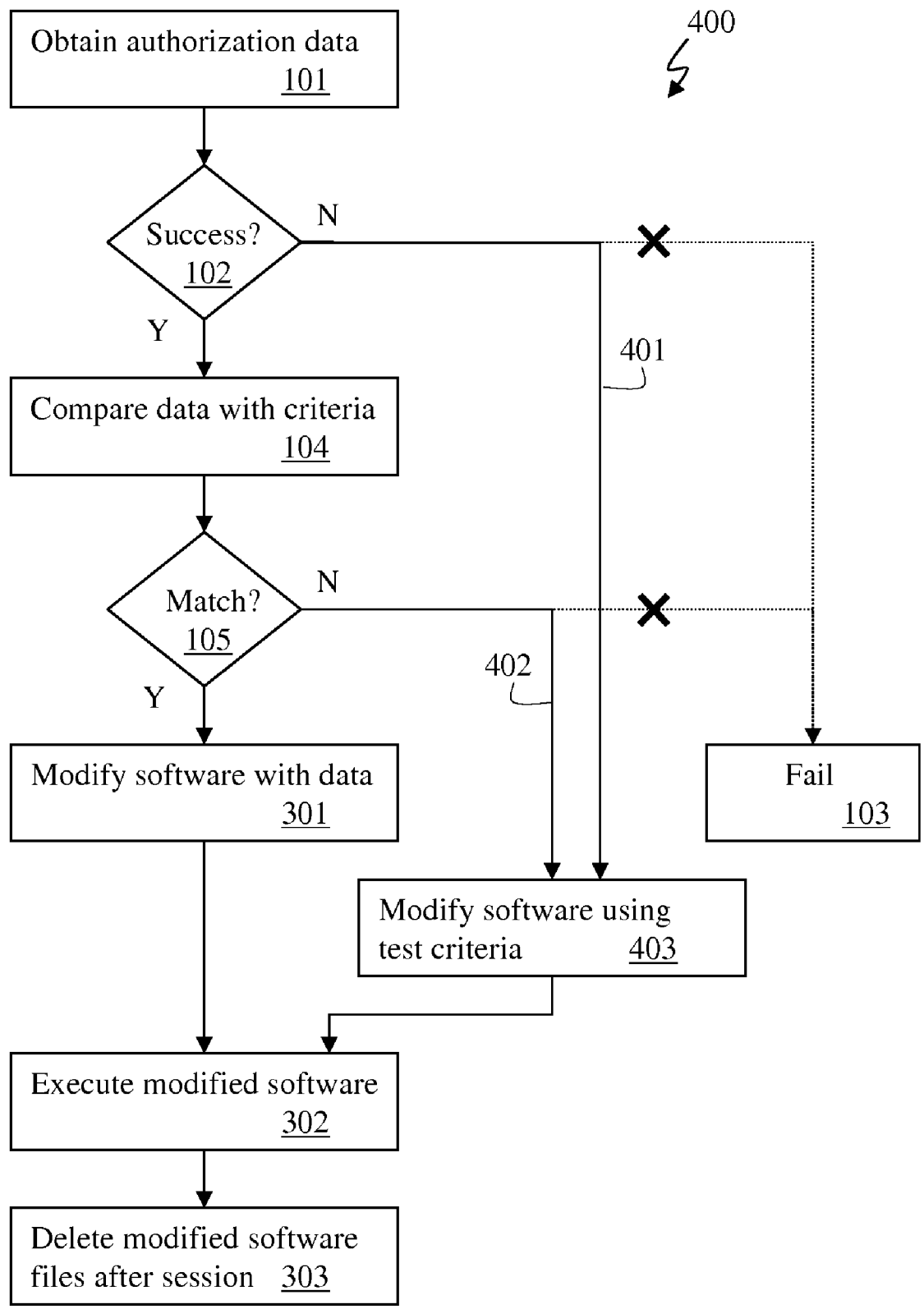
FIG. 4 illustrates another software attack.

One potential attack is illustrated in FIG. 4. An attacker has attempted a branch jamming attack at both decision blocks 102 and 105 by introducing alternate paths 40 and 402. Therefore, the absence of authorization data, or the entry of incorrect authorization data does not result in a fail state in block 103. However, the attacker has learned that merely bypassing the authorization data verification resulted in the execution of software with flawed data and/or instructions. That is, the attacker has figured out that the software and/or data files need to be modified in order to run the software with the desired capability. The attacker has also reverse engineered the license management system to identify not only where in the launcher the authorization data is compared with the authorization test criteria, but also has identified the content of the test criteria.

For example, if the authorization data comprises a password, which is hashed prior to being tested for validity, the authorization test criteria may be the hash result of the correct password. The authorization test for a match can then be a simple byte by byte comparison for equality between the test criteria and a hash of the password. Some poorly designed hash functions may be reversible, meaning that the password can be calculated using the test criteria. However, even for one-way hash functions, if the password is not very long, a brute force attack, which hashes candidate passwords and compares the results against the test criteria, could allow identification of the password within a timeframe that is acceptable to the attacker. Alternatively, if any license data is encrypted, the attacker may be able to watch the encryption or decryption process in memory within a stealthy debugging environment, obtain the key, and then use the key to decrypt any information the attacker desires. The attacker can then watch the software modification process in a stealthy debugging environment, learn what modifications are needed, and create a routine to make the modifications independently of the need for entering the authorization data, as indicated in block 403. This can attack can be accomplished without the attacker having access to the proper authorization data.

So unfortunately, the license management system's access to the test criteria, independent of the proper authorization data, can be leveraged by an attacker to learn the content of the authorization data, at least for systems operating in accordance with prior art method 100, and the teachings of in the '941 patent and the '905 application. The attacker's version of the software may then be distributed with a modification or additional program that carries out the function of block 403, which permits execution of the software with repaired instructions and/or data in block 302, even without access to the proper authorization data.

Figure 5:
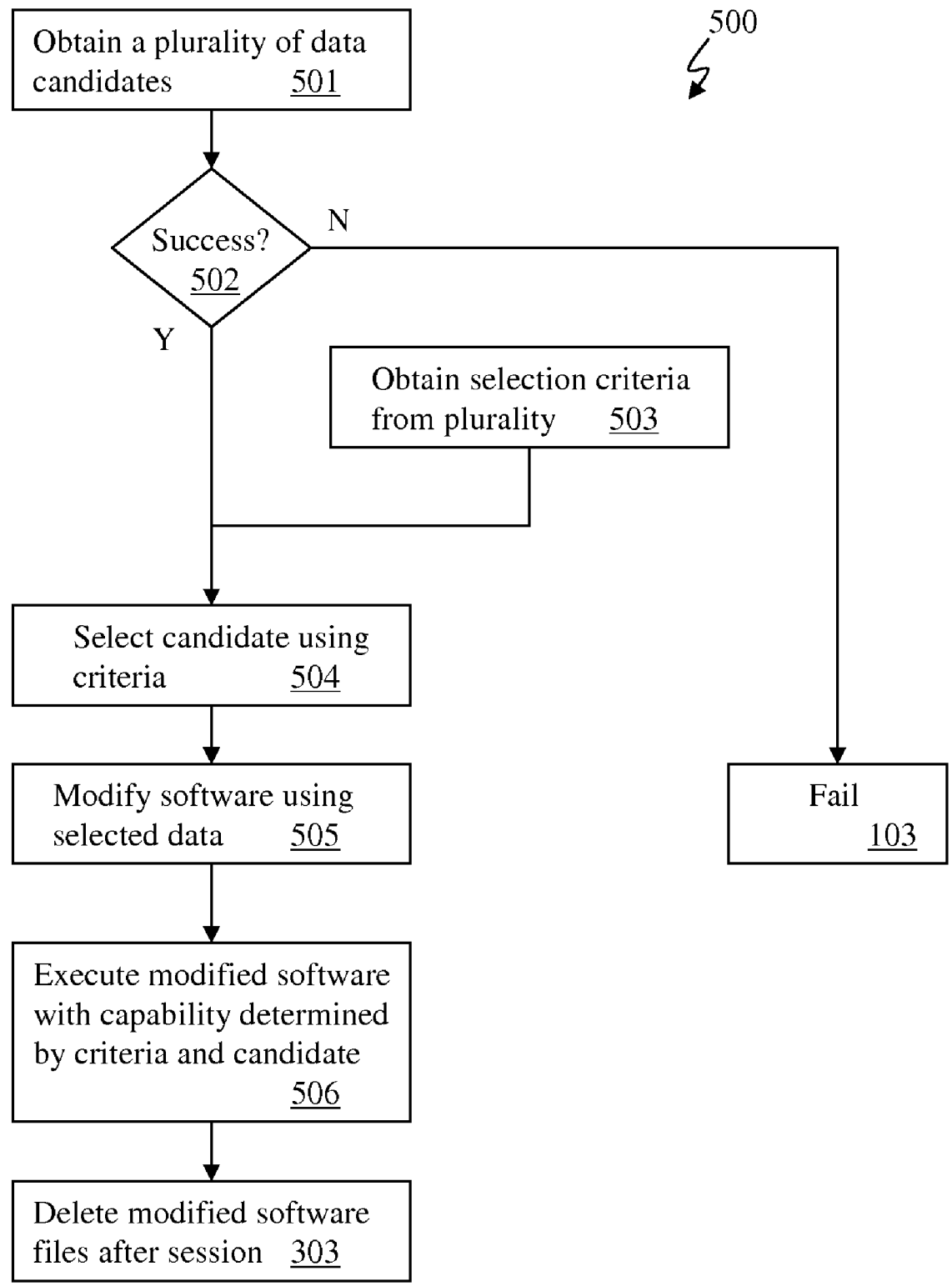
FIG. 5 illustrates a flow diagram for a further improved software license management method.

FIG. 5 illustrates a flow diagram for a further improved software license management method 500, in which the use of test criteria may be abandoned in favor of the use of selection criteria. Method 500 denies the attacker the ability to leverage test criteria to learn the information contained in the proper authorization data, because there is not a one-to-one match between any test criteria and the proper authorization data. That is, an attacker having full knowledge of any selection criteria, including the ability to decrypt it or reverse any function used to generate it, has not learned the proper authorization data. When there are differences between the proper authorization data and selection criteria, then an attack similar to the one shown in FIG. 4 may result in incorrect modification of the protected software in an equivalent of block 403. Thus, since the selection criteria does not identify exactly what authorization data is needed, full knowledge and exploitation of the selection criteria does not provide all the necessary information for repairing the protected software. A protection scheme operating in accordance with an embodiment of method 500 does not betray the authorization data contents by providing an indication of what a launcher needs.

In method 100 of FIG. 1, an attacker can operate according to the following assumption: whatever authorization data does not fail the authorization data verification process, which includes blocks 104 and 105, must be the proper authorization data. If an attacker does not have the proper authorization data, and is attempting to ascertain it by reverse engineering software that operates according to method 100, two categories of information are initially hidden from the attacker: (1) data that must be provided, and (2) data that should not be provided. Method 100 only leverages the first part of an attacker's uncertainty. Method 500 leverages both.

The principle that enables operating according to method 500 is that a user not only has control of what authorization data is provided to a software license management system, but also has control of what data is not provided. A check for a match between authorization data and test criteria may then be replaced with selection from among potentially multiple authorization data candidates to determine the one "closest" to selection criteria, or the prevailing selection criteria, if multiple selection criteria data sets are used during the selection process. To launch the software with proper operation, a user provides authorization data that is "close enough"—but not too close—to the selection criteria. This is because the authorization validation process may select incorrect authorization data that is closer to the selection criteria than is the proper authorization data. Distance may be measured in multiple ways, including the number of bits or bytes that are similar, arithmetic differences, or other methods, including weighted differences between portions of the data. Other selection criteria, apart from distance may also be used.

By introducing the possibility that the selection process could result in the selection of incorrect authorization data, instead of the proper authorization data, a software attacker is denied the full benefits of reverse engineering the authorization data selection process to learn all the secrets of what the authorization data must be. Using protection in accordance with method 500, even if an attacker learns all the secrets of selection criteria, the attacker has learned something that is close to the required data, but it is not the required data. In the framework of this paradigm, any authorization validation process that operates in accordance with method 100, by running protected software after a mere equality matching test between purported authorization data and test criteria, which is available independently of the authorization data, can be viewed as a facilitating gift to a software attacker.

In the illustrated embodiment of method 500, a plurality of authorization data candidates are obtained in block 501. These authorization data candidates may be a plurality of data sets in firmware, in a dongle, on a media disk, in a wireless device, for example an inductively powered wireless device, entered by a user, data derived from biometric data, or any other data from a security token or purported by a user to be authorization data. A launcher operating in accordance with an embodiment of method 500 may obtain a data set from a particular location identified by the launcher, while another launcher operating in accordance with another embodiment of method 500 searches a user's computer and certain systems or media coupled to the user's computer for data sets having certain characteristics. In decision block 502, method 500 determines whether authorization data candidates matching the characteristics have been obtained. This determination may include a test of a partial match between a data candidate and a selection criteria data set. In block 503, a plurality of selection criteria data sets is obtained, which are used for selecting a candidate from the plurality in block 504. Block 503 may occur prior in time to block 501. For example, multiple authorization data sets and selection criteria data sets may be preloaded onto separate media, for example a dongle may contain the candidates and a media disk may contain the selection criteria. Alternatively, a single selection criteria may be obtainable from a remote license bureau or be contained within a launcher. The closest pairing between all possible combinations of criteria with a candidate may identify the selected candidate in block 504. For another example, a set of selection criteria may be provided by a software developer for a multiple of software packages provided by that developer, including packages that a particular user may not yet have purchased. Upon purchase of a license, the developer then provides a set of multiple authorization codes on copy-protected media such as a dongle, which are pre-screened for closer matches, to ensure that a proper selection can be assured when the user attempts to operate the purchased software.

In block 505, instructions and/or data in volatile memory, which are relied upon by the software, are modified. The modifications may include any of those described for block 301 for method 300 of FIG. 3. The information used to determine the modifications comprises indications of the locations of the bytes to be modified, indications of the manner of changing the bytes, and/or the specific bits used to change to the bytes. The manner of change may be a replacement or a Boolean operation, such as an exclusive or (XOR). For example, the modification data may comprise information directing a launcher to (1) XOR the byte in volatile memory that corresponds to byte 1000 of the stored executable file with hex FA, (2) replace the byte in volatile memory that corresponds to byte 1001 of auxiliary file "LIB1.DLL" with 90.

The information used in determining the modifications in block 505 should include information that is available only by having access to the proper authorization data, and not from having access only to selection criteria. In some embodiments, data from selection criteria may be used in addition to what is determinable from the proper authorization data, but will not be all of the modification information that is needed. For example in some embodiments, the entire authorization data is processed in order to determine modification information in other embodiments, only portions are used, which include at least some portions of the authorization data that are different than the selection criteria. In some embodiments, the portions of the authorization data that is different from the selection criteria may be processed to determine the needed modification information. In some embodiments, the differences themselves between the selection criteria and the authorization data, such as a Boolean operation on the portions of difference, may be processed to determine the modification information. With this type of protection, an attacker reverse engineering the selection criteria has no knowledge of the needed modifications, similar to the way in which someone knowing the details of an encryption algorithm cannot decrypt data without the proper key. The differences then contain the secret data necessary to unlock the software functionality, and thus perform a role similar to an encryption key for an openly-published encryption algorithm.

Other variations are also possible for method 500. For example, the need for selection criteria could even be eliminated entirely, such that a launcher selects the first data provided as purported authorization data in block 504, makes the modifications in accordance with the provided data, and the protected program either operates correctly or else operates in whatever random manner is dictated by changes made according to the first data purported to be authorization data. In other embodiments, after considering multiple data candidates and two or more may be selected, and the differences between the selected ones may be used to determine the modifications. In this usage, "differences" between the authorization information and the selection criteria includes means differences in the compared information, which may not be the original data, but instead may be processed data. For example, if the authorization data is hashed prior to comparison with the selection criteria, "differences" means differences between the hashed authorization data and the selection criteria. Thus, due to the differences, the selection criteria does not contain information corresponding to all of the content of the authorization data.

In block 506, the software is executed, and is followed by block 303 upon completion of the execution of the software program. It should be understood that since method 500 uses any purported authorization data set selected in block 504, multiple data sets could repair the protected software to varying degrees. For example, one authorization data set may contain information necessary to repair all changes, whereas a second authorization data set may contain only enough information to repair some but not all changes, and a third authorization data set may contain information for repairing different changes than does the second authorization data set. A software developer producing software that operates in accordance with method 500 may, for example, produce multiple dongles that unlock differing sections of a particular software title. Since the portions unlocked are determinable by the selection of authorization data using selection criteria, controlling either the selection criteria or authorization data available for use by an embodiment of method 500 then enables control of the software capability.

Figure 6:
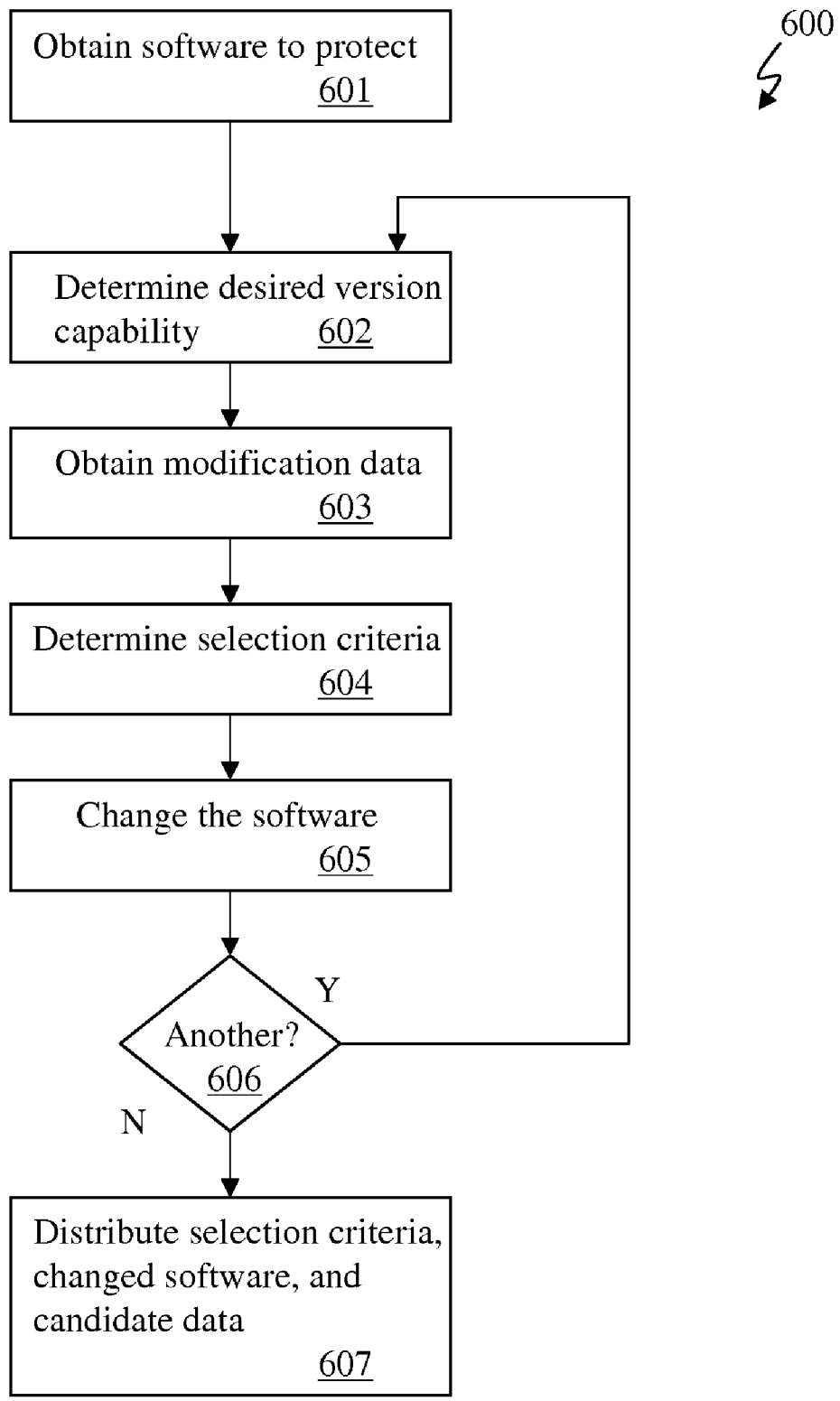
FIG. 6 illustrates a flow diagram of a method for protecting software.

FIG. 6 illustrates a flow diagram of a method 600 for protecting software. In block 600, the software to be protected is obtained by a software defender, which may be the primary software developer or a contracted protection services provider. In block 602, desired changes to the bytes are determined, which will enforce the desired license control but yet permit a user with certain license terms to be able to operate the software in accordance with method 500. Modification data is obtained in block 603, by any number of means, such as the generation of a random number or processing user data or software data with an algorithm. Other potential, but incorrect authorization data sets may also be determined or generated in order to facilitate determining selection criteria. In block 604, selection criteria is determined that will likely result in selection of the proper authorization data from among a set of potential authorization data sets that the software defender expects are likely to be presented to a launcher program by a potential user. It is important to note that the developer's assumptions may be incorrect, and the launcher may improperly select incorrect authorization data, even when operating on a computer system for which an authorized user has properly licensed the software. This possibility, although it contributes to poor customer relations when it occurs, is a driver for the enhanced security provided by method 500. However, the selection criteria may be so detailed and unique that this possibility is rendered exceptionally remote. Further, as described in relation to FIG. 9, this possibility can be addressed with a diagnostic utility.

As a comparison, consider the use of public key cryptography. There is no central entity that controls the generation of public key pairs. Anyone running a key generation program could accidentally generate a key pair that is identical to that of another user. And yet, public key cryptography is widely used, even though this possibility exists. This is because the possibility of such an accident is so low that it has been accepted. The authorization data and selection criteria generation process can be tailored to make the data sets long enough and unique enough that another data set randomly available on a user's computer or on anything coupled to the user's computer is highly unlikely to be selected ahead of the proper authorization data. This can be accomplished simultaneously with retaining sufficient differences between the authorization data and the selection criteria to keep the modification data reasonably secret.

Generation of the data sets may be independent, or one set may be generated from the other by introducing differences. For some embodiments, when two data sets are generated, either one may be used as authorization data or selection criteria. In some systems, designation of authorization data versus selection criteria may be arbitrary. In some embodiments, selection criteria may be generated by truncating authorization data. The authorization data and its corresponding selection criteria form an authorization pair, which contains the information a launcher needs to restore functionality.

The software and/or data relied upon by the software is changed in block 605 such that corresponding modifications in block 505 of method 500 result in the functionality determined in block 602. In decision block 606, method 600 determines whether another combination of functionality, authorization data and selection criteria is needed for a different distribution the software. If so, method 600 returns to block 603. The relevant license data packages are distributed in block 607.

Figure 7:
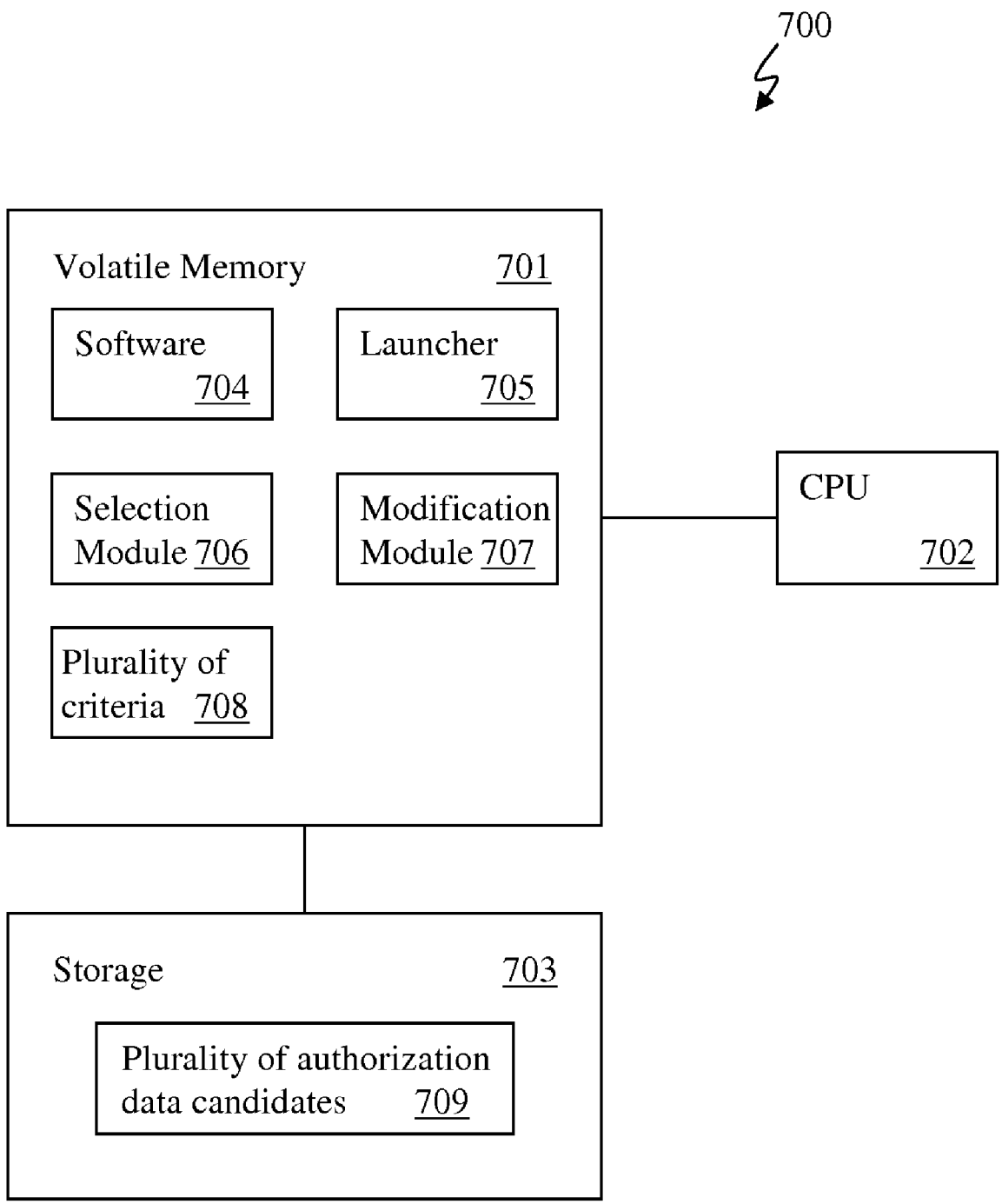
FIG. 7 illustrates an embodiment of a software license management system.

FIG. 7 illustrates an embodiment of a software license management system 700, which can operate in accordance with method 500 or, in a modified embodiment, can operate in accordance with method 300. System 700 comprises volatile memory 701 coupled to a CPU 702 and storage 703. In some embodiments, volatile memory 701 is coupled to storage 703 through CPU 702. In the illustrated embodiment software 704 has been loaded into volatile memory 701, although it may have been previously stored on permanent media in a protected state. Launcher 705, also in volatile memory 701 is executed by CPU to modify software 704 and possibly decrypt at least portions of software 704. In some embodiments, launcher 705 is coupled to and distributed along with software 704, although in other embodiments, launcher 705 and software 704 are separate packages. Selection module 706 is used by launcher 705 to identify authorization data, and in some embodiments may be contained within launcher 705. Replacing selection module 706 with a match check would cause system 700 to operate more compatibly with method 300 than with method 500. Modification module 707 performs the modifications described for block 505 of method 500 or block 301 of method 300. In some embodiments, modification module 707 is contained within launcher 705, although in other embodiments, it may be a separately-executed process.

In the illustrated embodiment, a plurality of selection criteria data sets 708 is shown already residing in volatile memory 701. For some embodiments of system 701, the plurality may instead be a single data set. For some embodiments of system 701, data sets 708 may be contained within launcher 705, whereas for other embodiments, at least some of data sets 708 may be imported into volatile memory 701 from another source, such as another computer system, a media drive or non-volatile memory coupled to CPU 702. Also in the illustrated embodiment, a plurality of authorization data candidates 709 is shown residing in storage 703. Storage 703 comprises a computer readable medium, such as a media disk, magnetic or optical, a dongle or other non-volatile memory, firmware, BIOS or extensible firmware interface (EFI). Some embodiments of system 700 provide for one or more of authorization data candidates 709 to be entered by a user, for example by using a keyboard, biometric reader, scanner, or other data input device.

Figure 8:
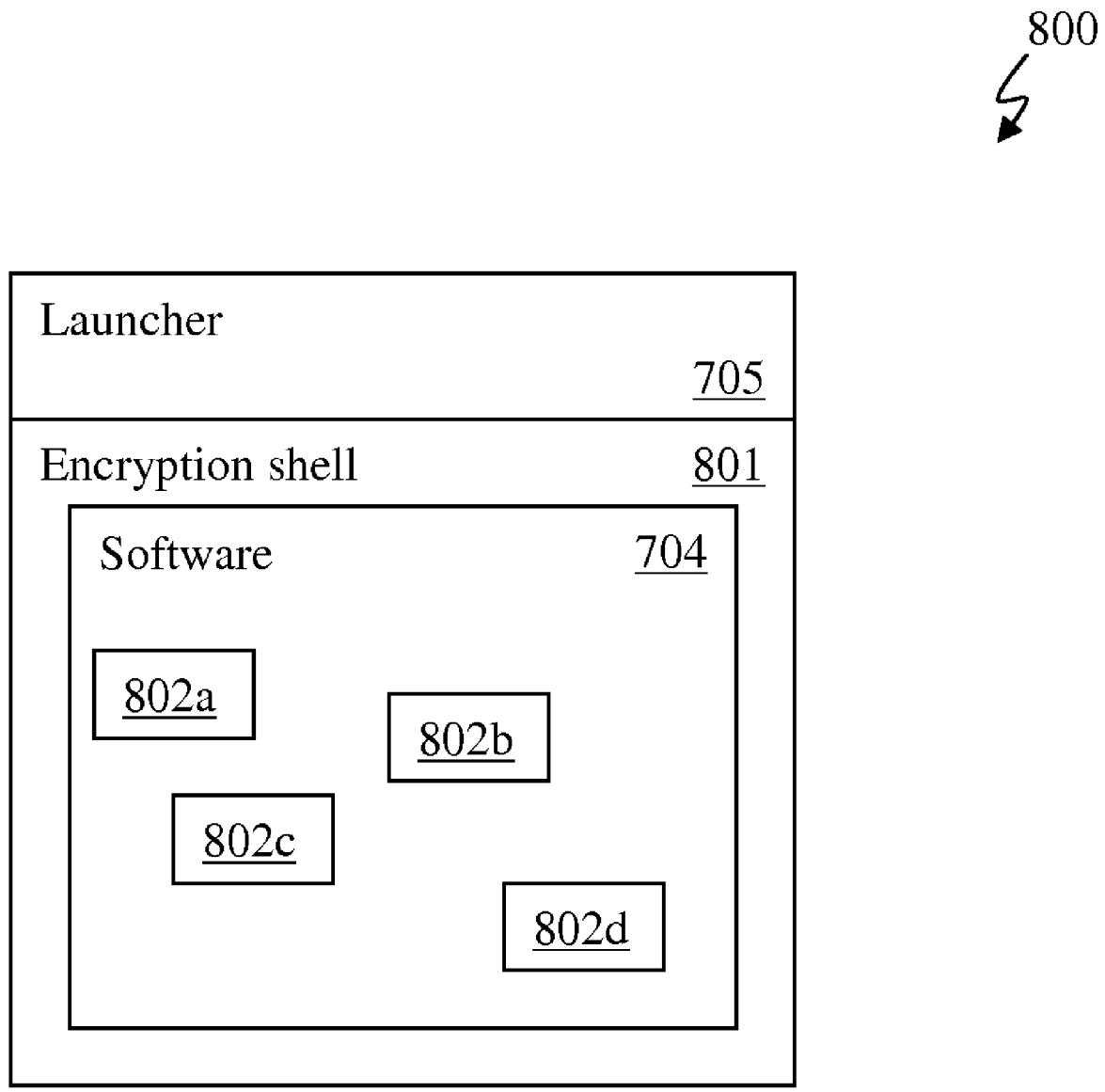
FIG. 8 illustrates an embodiment of protected software.

FIG. 8 illustrates an embodiment of protected software 800. Protected software 800 includes launcher 705 coupled to software 704, which is wrapped with encryption shell 801. It should be understood that in some embodiments, not all of software 704 may be encrypted. Within software 704, portions 802a-802d have been changed to reduce the capability of software 704. Upon launcher 705 selecting the proper authorization data candidate, one or more of portions 802a-802d may be modified, thereby at least partially restoring operation of software 704.

Figure 9:
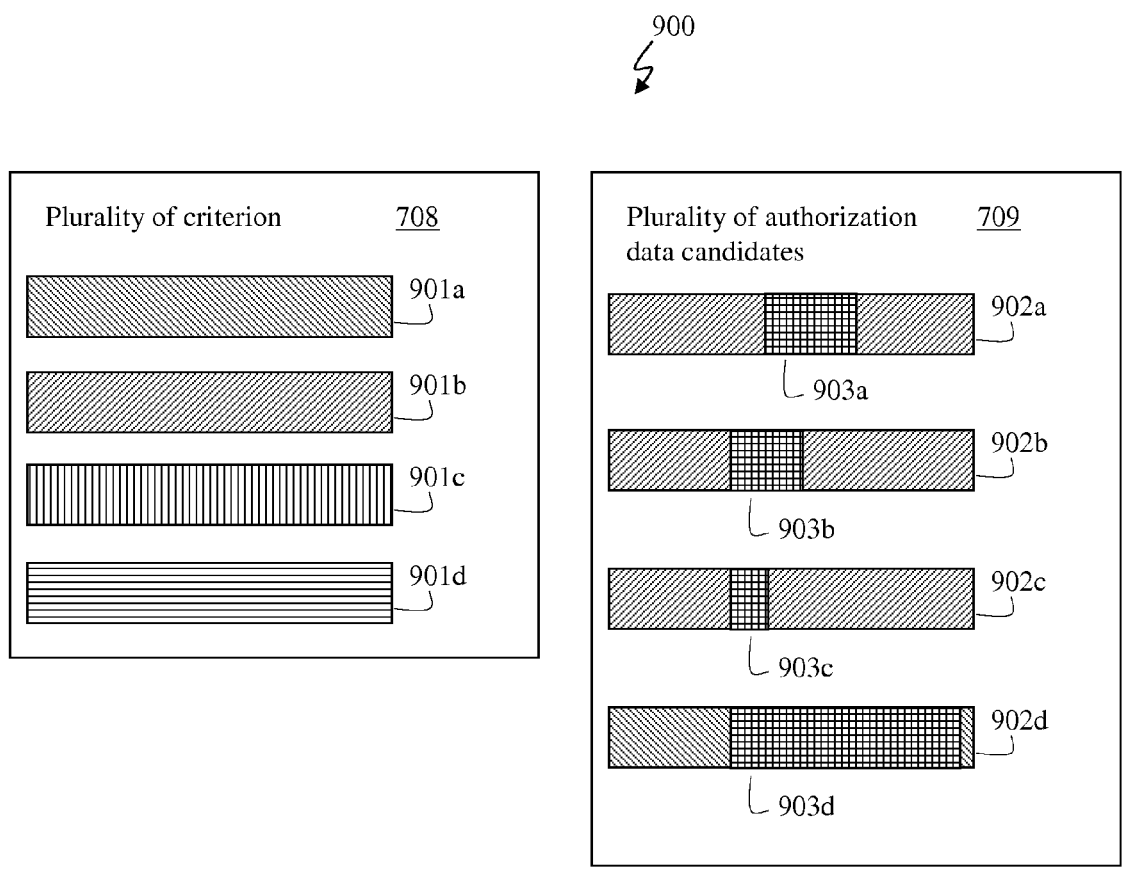
FIG. 9 illustrates a notional representation of license management data.

FIG. 9 illustrates license management data in a notional representation 900. Files that produce data in representation 900 may be stored on separate media or separate systems, but need to be coupled to launcher 705, although not necessarily simultaneously, in order to enable launcher 705 to properly modify portions 802a-802d of software 704. Plurality of selection criteria data sets 708 comprises selection criteria data sets 901a-901d. Plurality of authorization data candidates 709 comprises candidates 902a-902d. As illustrated, candidates 902a-902c are similar to selection criteria data set 901b, whereas candidate 902d has some similarity to selection criteria data set 901a. Differences 903a-903c reflect differences between selection criteria data set 901b and candidates 902a-902c, respectively, and candidate 902d has difference 903d from criteria data set 901a. It should be understood that the graphical representation of differences 903a-903d are notional, and that differences between binary data sets can be measured and determined in multiple manners.

As illustrated, difference 903c is the smallest, so that an embodiment of method 500 of FIG. 5 is likely to select candidate 902c in block 504, if criteria data set 901b was obtained in block 503. However, if only criteria data set 901a had been obtained in block 503, then candidate 902d would be selected. The possibility described earlier, in which method 500 could potentially select incorrect authorization data instead of proper authorization data, would occur if candidate 902b was actually the proper authorization data. In such a case, difference 903b, rather than difference 903c would furnish the best information for modifying protected software. If candidate 902c provides problems for the user, the software developer may furnish a diagnostic utility to the user that identifies license management conflicts, and would therefore identify the reasons for non-selection of candidate 902b. The user could then decide between deleting whatever data produces candidate 902c, or else requesting a different criteria and candidate pair.

Candidate 902a could represent random data on the user's computer or else a prior license. For example, a user may have obtained a first license with an initial capability from the software developer, but then upgraded to a second license. Candidate 902a could then have been furnished by the developer in order to facilitate the first license, and candidate 902b would then have been furnished for the second license. In the illustrated representation, since difference 903b is smaller than difference 903a, the license upgrade is automatically granted by the candidate selection process, although for some embodiments, the user may be instructed to delete any copies of candidate 903a to ensure that 902b is the one selected. This form of license management is different than systems in which a software developer distributes a patch upon payment of a license fee, to modify newly-licensed software. Such license management systems typically modify a permanently stored copy of the software in a non-volatile storage medium, and thus only need to be accomplished once.

Although the present invention and its advantages have been described above, it should be understood that various changes, substitutions and alterations can be made herein without departing from the spirit and scope of the invention as defined by the appended claims. Moreover, the scope of the present application is not intended to be limited to the particular embodiments described in the specification.

What is claimed is:

1. A method of managing a software license, the method comprising:
   loading a software program into volatile memory;
   obtaining a plurality of authorization data candidates;
   selecting authorization data from the plurality of authorization data candidates, wherein selecting the authorization data from the plurality of authorization data candidates comprises:
      comparing the plurality of authorization data candidates with a selection criteria that does not contain information corresponding to all of the compared information within the authorization data;
      identifying a difference between the selection criteria and each of the authorization data candidates; and
      selecting the authorization data using the identified difference;
   modifying a portion of the program in volatile memory with the selected authorization data, wherein modifying a portion of the volatile memory comprises replacing a first byte with a second byte; and
   executing the modified program.

2. The method of claim 1 wherein the authorization data comprises information indicating a location of the portion of volatile memory to be modified.

3. The method of claim 1 wherein the authorization data comprises information indicating a manner of making the modifications.

4. The method of claim 1 wherein modifying a portion of the volatile memory comprises changing the program from a first operable state to a second operable state.

5. The method of claim 4 wherein changing the program from a first operable state to a second operable state comprises improving the capability of the program.

6. The method of claim 1 wherein executing the program comprises launching the program with a launcher.

7. The method of claim 1 further comprising:
   decrypting the program prior to the modifying.

8. The method of claim 1 wherein selecting the authorization data from a plurality of authorization data candidates further comprises comparing the plurality of authorization data candidates with a plurality of selection criteria.

9. The method of claim 1 wherein modifying a portion of the volatile memory relied upon by the program in accordance with the authorization data comprises modifying a portion of the volatile memory relied upon by the program in accordance with the identified difference.

10. The method of claim 1 further comprising:
    selecting a byte of an initial software program, wherein the selected byte comprises at least one selected from the list consisting of:
       a control flow instruction, data used in control flow, and data used in a calculation; and
    changing the byte from a first value to a second value, such that the modification changes a corresponding byte in volatile memory from the second value to the first value.

11. The method of claim 1 further comprising:
    generating an authorization pair comprising the authorization data and selection criteria, wherein the selection criteria does not contain information corresponding to all of the content of the authorization data.

* * * * *